(12) United States Patent
Maekawa

(10) Patent No.: US 10,061,321 B2
(45) Date of Patent: Aug. 28, 2018

(54) AUTONOMOUS MOBILE APPARATUS, AUTONOMOUS MOBILE METHOD, AND AUTONOMOUS MOBILE SYSTEM

(71) Applicant: Panasonic Intellectual Property Corporation of America, Torrance, CA (US)

(72) Inventor: Hajime Maekawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 8 days.

(21) Appl. No.: 15/451,624

(22) Filed: Mar. 7, 2017

(65) Prior Publication Data

US 2017/0269597 A1    Sep. 21, 2017

Related U.S. Application Data

(60) Provisional application No. 62/310,129, filed on Mar. 18, 2016.

(30) Foreign Application Priority Data

Sep. 8, 2016  (JP) .................................. 2016-175207

(51) Int. Cl.
  *G05D 1/02* (2006.01)
  *G05D 1/00* (2006.01)
  *G01C 23/00* (2006.01)
(52) U.S. Cl.
  CPC ......... *G05D 1/0212* (2013.01); *G05D 1/0088* (2013.01); *G05D 1/0276* (2013.01); *G05D 1/0289* (2013.01); *G05D 2201/0203* (2013.01)

(58) Field of Classification Search
  CPC ......... G05D 1/0088; G05D 2201/0203; G05D 1/0212; G05D 1/0276; G05D 1/0289; Y10S 901/01

(Continued)

(56) References Cited

U.S. PATENT DOCUMENTS

2009/0276110 A1* 11/2009 Martinez ............... G01S 17/026
                                                                701/23
2010/0036556 A1*  2/2010 Na ........................ G05D 1/0227
                                                                701/26

(Continued)

FOREIGN PATENT DOCUMENTS

JP      2008-021178     1/2008

*Primary Examiner* — Gertrude Arthur Jeanglaude
(74) *Attorney, Agent, or Firm* — Greenblum & Bernstein, P.L.C.

(57) ABSTRACT

An autonomous mobile apparatus includes one or more memories and circuitry which, in operation, performs operations including determining a first control method or a second control method as a control method for controlling the autonomous mobile apparatus on the basis of information regarding another autonomous mobile apparatus, the first control method being a method for controlling the autonomous mobile apparatus or the other autonomous mobile apparatus such that the autonomous mobile apparatus or the other autonomous mobile apparatus autonomously moves in a certain area using a first control algorithm and the second control method being a method for controlling the autonomous mobile apparatus or the other autonomous mobile apparatus such that the autonomous mobile apparatus or the other autonomous mobile apparatus autonomously moves in the certain area using a second control algorithm, and autonomously moving the autonomous mobile apparatus using the determined control method.

11 Claims, 10 Drawing Sheets

(58) Field of Classification Search
USPC .............................. 701/23, 36, 300; 700/245
See application file for complete search history.

(56) References Cited

U.S. PATENT DOCUMENTS

2015/0229265 A1* 8/2015 Morita .................... A47L 11/24
  701/23
2015/0236640 A1* 8/2015 Miyake ................... H02S 40/10
  15/383

* cited by examiner

AUTONOMOUS MOBILE APPARATUS, AUTONOMOUS MOBILE METHOD, AND AUTONOMOUS MOBILE SYSTEM

BACKGROUND

1. Technical Field

The present disclosure relates to an autonomous mobile apparatus, an autonomous mobile method, and an autonomous mobile system in which autonomous movement is performed in a certain area using a method for controlling autonomous movement.

2. Description of the Related Art

In these years, autonomous mobile robots such as cleaning robots that clean a floor while autonomously moving on the floor are gaining in popularity. In Japanese Unexamined Patent Application Publication No. 2008-21178, for example, an autonomous mobile robot is disclosed that includes a movement control system that drives the autonomous mobile robot, observation means for observing relative positions of objects around the autonomous mobile robot, human intervention information reception means for receiving human intervention information from an outside, a semi-automatic movement route planning engine that creates a movement route using an algorithm based on observed object positional information and the human intervention information, and a movement command generation unit that generates a movement command for moving the autonomous mobile robot on the basis of the movement route.

SUMMARY

The above example of the related art requires further improvements.

In one general aspect, the techniques disclosed here feature an autonomous mobile apparatus including one or more memories and circuitry which, in operation, performs operations including determining a first control method or a second control method as a control method for controlling the autonomous mobile apparatus on the basis of information regarding another autonomous mobile apparatus, the first control method being a method for controlling the autonomous mobile apparatus or the other autonomous mobile apparatus such that the autonomous mobile apparatus or the other autonomous mobile apparatus autonomously moves in a certain area using a first control algorithm and the second control method being a method for controlling the autonomous mobile apparatus or the other autonomous mobile apparatus such that the autonomous mobile apparatus or the other autonomous mobile apparatus autonomously moves in the certain area using a second control algorithm, and autonomously moving the autonomous mobile apparatus using the determined control method.

According to the present disclosure, further improvements are achieved.

It should be noted that general or specific aspects may be implemented as a system, an apparatus, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
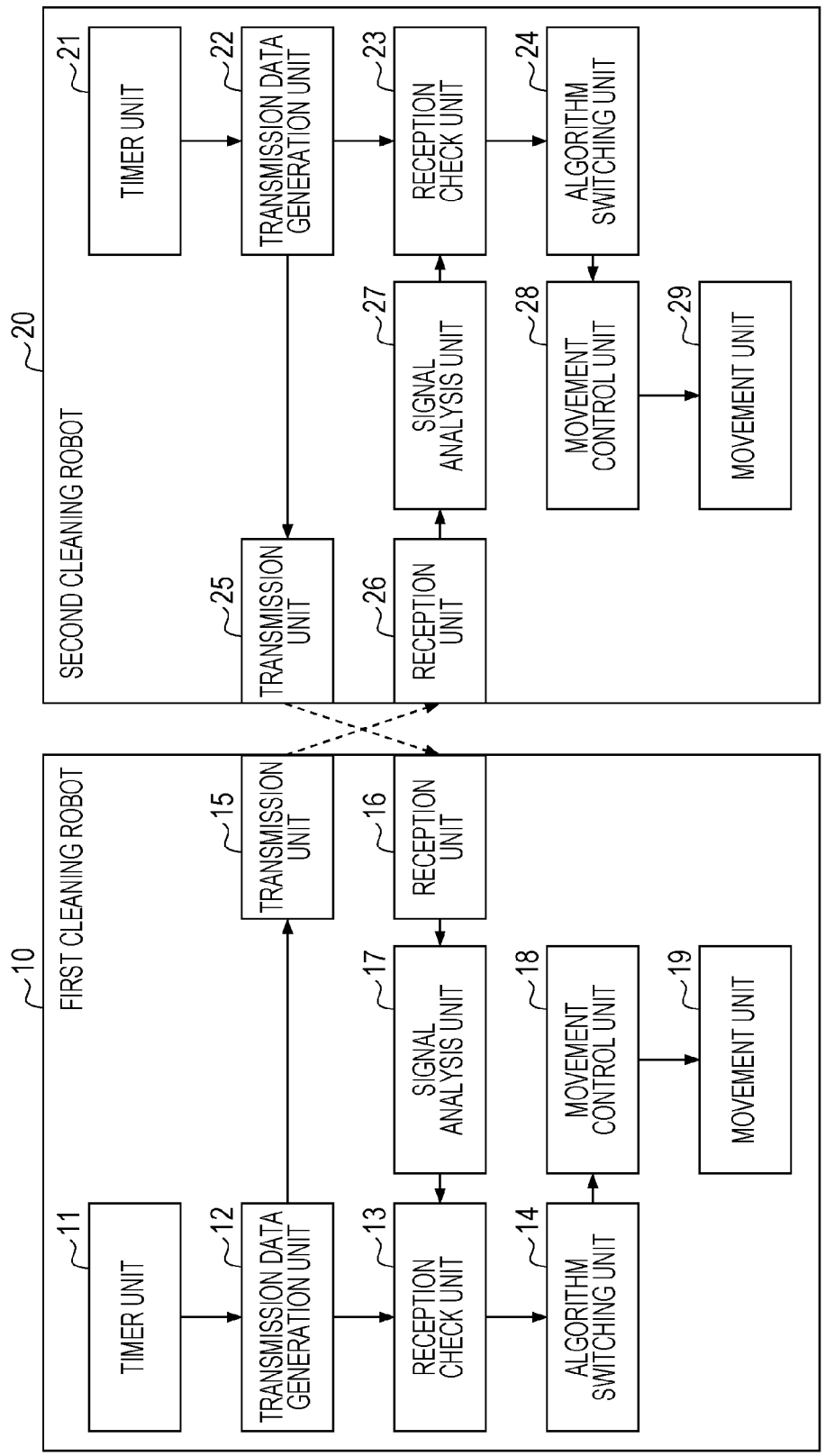
FIG. 1 is a block diagram illustrating the configuration of an autonomous mobile system according to a first embodiment of the present disclosure.

Underlying Knowledge Forming Basis of Present Disclosure

In these years, autonomous mobile robots such as cleaning robots that clean a floor while moving on the floor are gaining in popularity (e.g., refer to Japanese Unexamined Patent Application Publication No. 2008-21178). A cleaning robot disclosed in the example of the related art stores an algorithm for controlling autonomous movement and cleans a room while autonomously moving in the room in accordance with the algorithm. A conventional cleaning robot generally stores one algorithm. If a plurality of cleaning robots autonomously move in a room, therefore, the plurality of cleaning robots move along similar routes, and it is difficult for the plurality of cleaning robots to efficiently clean the room.

It is assumed that at least two cleaning robots clean a certain area, that is, for example, a room. At this time, the two cleaning robots clean the room using the same algorithm. An example of the algorithm is an algorithm by which a cleaning robot cleans a room while moving in the room clockwise. This algorithm will be referred to as a "clockwise algorithm".

If the two cleaning robots operate using the clockwise algorithm in the room, both the cleaning robots move in the room clockwise, that is, clean the room while moving along similar routes, and it is difficult for the cleaning robots to efficiently clean the room.

On the basis of this observation, the present inventors have conceived the following aspects of the present disclosure.

An autonomous mobile apparatus according to an aspect of the present disclosure is an autonomous mobile apparatus including one or more memories and circuitry which, in operation, performs operations including determining a first control method or a second control method as a control method for controlling the autonomous mobile apparatus on the basis of information regarding another autonomous mobile apparatus, the first control method being a method for controlling the autonomous mobile apparatus or the other autonomous mobile apparatus such that the autonomous mobile apparatus or the other autonomous mobile apparatus autonomously moves in a certain area using a first control algorithm and the second control method being a method for controlling the autonomous mobile apparatus or the other autonomous mobile apparatus such that the autonomous mobile apparatus or the other autonomous mobile apparatus autonomously moves in the certain area using a second control algorithm, and autonomously moving the autonomous mobile apparatus using the determined control method.

According to this configuration, a method for controlling the autonomous mobile apparatus can be determined on the basis of the information regarding the other autonomous mobile apparatus.

In addition, in the autonomous mobile apparatus, in the determining, the second control method may be determined as the method for controlling the autonomous mobile apparatus if the other autonomous mobile apparatus autonomously moves using the first control method, and the first control method may be determined as the method for controlling the autonomous mobile apparatus if the other autonomous mobile apparatus autonomously moves using the second control method.

According to this configuration, since the autonomous movement of the autonomous mobile apparatus and the other autonomous mobile apparatus is controlled using different control methods, the autonomous mobile apparatuses can move along different routes. As a result, operation efficiencies of the autonomous mobile apparatuses improve.

In addition, in the autonomous mobile apparatus, the first control method may be a method by which the autonomous mobile apparatus or the other autonomous mobile apparatus moves mainly clockwise. The second control method may be a method by which the autonomous mobile apparatus or the other autonomous mobile apparatus moves mainly counterclockwise.

According to this configuration, the autonomous mobile apparatus autonomously moves using a clockwise method and the other autonomous mobile apparatus autonomously moves using a counterclockwise method, or the autonomous mobile apparatus autonomously moves using the counterclockwise method and the other autonomous mobile apparatus autonomously moves using the clockwise method. As a result, the autonomous mobile apparatus and the other autonomous mobile apparatus move along different routes.

In addition, the autonomous mobile apparatus may further include a first receiver that, if the other autonomous mobile apparatus is located rightward relative to a movement direction of the autonomous mobile apparatus, receives identification information identifying the other autonomous mobile apparatus, and a second receiver that, if the other autonomous mobile apparatus is located leftward relative to the movement direction of the autonomous mobile apparatus, receives the identification information identifying the other autonomous mobile apparatus. In the determining, the second control method may be determined as the method for controlling the autonomous mobile apparatus if the first receiver receives the identification information, and the first control method may be determined as the method for controlling the autonomous mobile apparatus if the second receiver receives the identification information.

According to this configuration, the method for controlling the autonomous mobile apparatus is determined in accordance with a position of the other autonomous mobile apparatus, and the autonomous mobile apparatus autonomously moves in a direction in which the other autonomous mobile apparatus does not exist. As a result, the autonomous mobile apparatus and the other autonomous mobile apparatus move along different routes.

In addition, the autonomous mobile apparatus may further include a transmitter that transmits first identification information identifying the autonomous mobile apparatus, and a receiver that receives second identification information identifying the other autonomous mobile apparatus transmitted from the other autonomous mobile apparatus. The first control method may be initially set as the method for controlling the autonomous mobile apparatus. In the determining, the method for controlling the autonomous mobile apparatus may switch from the first control method to the second control method if the second identification information is received before the first identification information is transmitted.

According to this configuration, if the autonomous mobile apparatus receives the second identification information before transmitting the first identification information, the method for controlling the autonomous mobile apparatus switches from the first control method to the second control method, and if the other autonomous mobile apparatus receives the first identification information before transmitting the second identification information, a method for controlling the other autonomous mobile apparatus switches from the first control method to the second control method. As a result, the autonomous mobile apparatus and the other autonomous mobile apparatus use different control methods.

In addition, in the autonomous mobile apparatus, in the determining, if the method for controlling the autonomous mobile apparatus switches from the first control method to the second control method after the autonomous mobile apparatus turns on, the second control method may be maintained until the autonomous mobile apparatus turns off.

According to this configuration, it is possible to prevent the method for controlling the autonomous mobile apparatus from switching frequently.

In addition, the autonomous mobile apparatus may further include a storage that stores a first identification number unique to the autonomous mobile apparatus, and a receiver that receives a second identification number, which is different from the first identification number, unique to the other autonomous mobile apparatus. The first control method may be initially set as the method for controlling the autonomous mobile apparatus. In the determining, the method for controlling the autonomous mobile apparatus may switch from the first control method to the second control method if the second identification number is larger than the first identification number.

According to this configuration, the first identification number unique to the autonomous mobile apparatus and the second identification number unique to the other autonomous mobile apparatus are compared, and if the second identification number is larger than the first identification number, the control method switches. As a result, it is easy to determine whether to switch the control method.

In addition, the autonomous mobile apparatus may further include a transmitter that transmits, to a server, identification information identifying the autonomous mobile apparatus and arrangement place information indicating a place where the autonomous mobile apparatus is arranged, and a receiver that receives, from the server, a registration number provided for the autonomous mobile apparatus on the basis of a number of autonomous mobile apparatuses arranged in the place, each of the autonomous mobile apparatuses being the autonomous mobile apparatus. In the determining, the first control method may be determined as the method for controlling the autonomous mobile apparatus if the received registration number is an odd number, and the second control method may be determined as the method for controlling the autonomous mobile apparatus if the received registration number is an even number.

According to this configuration, the control method is determined in accordance with whether the registration number provided by the server is an even number or an odd number. As a result, the control method can be easily determined.

In addition, the autonomous mobile apparatus may further include a front receiver that receives identification information identifying the other autonomous mobile apparatus if the other autonomous mobile apparatus is located ahead of the autonomous mobile apparatus in a movement direction of the autonomous mobile apparatus, and a rear receiver that receives the identification information identifying the other autonomous mobile apparatus if the other autonomous mobile apparatus is located behind the autonomous mobile apparatus in the movement direction of the autonomous mobile apparatus. In the determining, a current control method may be maintained as the method for controlling the autonomous mobile apparatus if the rear receiver receives the identification information, and the method for controlling the autonomous mobile apparatus may switch from the current control method to another control method if the front receiver receives the identification information.

According to this configuration, if the other autonomous mobile apparatus is located behind, the current control method is maintained, and if the other autonomous mobile apparatus is located ahead, the control method switches from the current control method to another control method. As a result, the autonomous mobile apparatus and the other autonomous mobile apparatus move along different routes.

A method for autonomously moving an autonomous mobile apparatus according to another aspect of the present disclosure is a method including determining a second control method as a control method for controlling the autonomous mobile apparatus if another autonomous mobile apparatus autonomously moves using a first control method or the first control method as the control method for controlling the autonomous mobile apparatus if the other autonomous mobile apparatus autonomously moves using the second control method, the first control method being a method for controlling the autonomous mobile apparatus or the other autonomous mobile apparatus such that the autonomous mobile apparatus or the other autonomous mobile apparatus autonomously moves in a certain area using a first control algorithm and the second control method being a method for controlling the autonomous mobile apparatus or the other autonomous mobile apparatus such that the autonomous mobile apparatus or the other autonomous mobile apparatus autonomously moves in the certain area using a second control algorithm, and autonomously moving the autonomous mobile apparatus using the determined control method.

According to this configuration, since the autonomous movement of the autonomous mobile apparatus and the other autonomous mobile apparatus is controlled using different control methods, the autonomous mobile apparatuses can move along different routes. As a result, operation efficiencies of the autonomous mobile apparatuses improve.

An autonomous mobile system according to another aspect of the present disclosure includes a first autonomous mobile apparatus and a second autonomous mobile apparatus. The first autonomous mobile apparatus includes circuitry which, in operation, performs operations including determining a second control method as a control method for controlling the first autonomous mobile apparatus if the second autonomous mobile apparatus autonomously moves using a first control method or the first control method as the control method for controlling the first autonomous mobile apparatus if the second autonomous mobile apparatus autonomously moves using the second control method, the first control method being a method for controlling the first autonomous mobile apparatus or the second autonomous mobile apparatus such that the first autonomous mobile apparatus or the second autonomous mobile apparatus autonomously moves in a certain area using a first control algorithm and the second control method being a method for controlling the first autonomous mobile apparatus or the second autonomous mobile apparatus such that the first autonomous mobile apparatus or the second autonomous mobile apparatus autonomously moves in the certain area using a second control algorithm, and autonomously moving the first autonomous mobile apparatus using the determined control method for controlling the first autonomous mobile apparatus. The second autonomous mobile apparatus includes circuitry which, in operation, performs operations including determining the first control method or the second control method as a control method for controlling the second autonomous mobile apparatus, and autonomously moving the second autonomous mobile apparatus using the determined control method for controlling the second autonomous mobile apparatus.

According to this configuration, since the autonomous movement of the autonomous mobile apparatus and the other autonomous mobile apparatus is controlled using different control methods, the autonomous mobile apparatuses can move along different routes. As a result, operation efficiencies of the autonomous mobile apparatuses improve.

Embodiments of the present disclosure will be described hereinafter with reference to the accompanying drawings. It is to be noted that the following embodiments are specific examples of the present disclosure and do not limit the technical scope of the present disclosure.

First Embodiment

FIG. 1 is a block diagram illustrating the configuration of an autonomous mobile system according to a first embodiment of the present disclosure. The autonomous mobile system illustrated in FIG. 1 includes a first cleaning robot 10 and a second cleaning robot 20.

In FIG. 1, the first cleaning robot 10 includes a timer unit 11, a transmission data generation unit 12, a reception check unit 13, an algorithm switching unit 14, a transmission unit 15, a reception unit 16, a signal analysis unit 17, a movement control unit 18, and a movement unit 19.

In FIG. 1, the second cleaning robot 20 includes a timer unit 21, a transmission data generation unit 22, a reception check unit 23, an algorithm switching unit 24, a transmission unit 25, a reception unit 26, a signal analysis unit 27, a movement control unit 28, and a movement unit 29.

The first cleaning robot 10 is an example of an autonomous mobile apparatus or a first autonomous mobile apparatus, and the second cleaning robot 20 is an example of another autonomous mobile apparatus or a second autonomous mobile apparatus.

The configuration of the second cleaning robot 20 is the same as that of the first cleaning robot 10, and only the configuration of the first cleaning robot 10 will be described hereinafter.

The first cleaning robot 10 autonomously moves in a certain area using a control algorithm (control method) for controlling autonomous movement. The second cleaning robot 20, too, autonomously moves in the certain area. The first and second cleaning robots 10 and 20 clean the certain area while autonomously moving in the certain area. The certain area is a two-dimensional area such as a floor of a room in a building.

The control algorithm may be a first control algorithm (first control method) for controlling the autonomous movement of the first cleaning robot 10 such that the first cleaning robot 10 moves along a first route or a second control algorithm (second control method) for controlling the autonomous movement of the first cleaning robot 10 such that the first cleaning robot 10 moves along a second route, which is different from the first route. For example, the first control algorithm is a clockwise algorithm (clockwise method) by which the first cleaning robot 10 moves mainly clockwise, and the second control algorithm is a counterclockwise algorithm (counterclockwise method) by which the first cleaning robot 10 moves mainly counterclockwise. Alternatively, the first control algorithm may be a counterclockwise algorithm, and the second control algorithm may be a clockwise algorithm. The first control algorithm, that is, the clockwise algorithm, is initially set to the first cleaning robot 10.

The timer unit 11 regularly, namely every minute, for example, generates a timing at which transmission data including unique information identifying the first cleaning robot 10 is transmitted. The unique information is, for example, information identifying a manufacturer of the first cleaning robot 10. The unique information regarding the first cleaning robot 10 is the same as unique information regarding the second cleaning robot 20.

The transmission data generation unit 12 generates transmission data including the unique information identifying the first cleaning robot 10 such that the transmission data does not collide with noise or transmission data from the other cleaning robot. The transmission data generation unit 12 transmits the generated transmission data to the transmission unit 15. The transmission data generation unit 12 also transmits transmission history information, which indicates that the transmission data has been transmitted, to the reception check unit 13.

The transmission unit 15 transmits transmission data generated by the transmission data generation unit 12 using a certain wireless communication method. The transmission unit 15 transmits transmission data including the unique information (first identification information) identifying the first cleaning robot 10. The transmission unit 15 may transmit transmission data using infrared light.

The reception unit 16 receives transmission data transmitted from the second cleaning robot 20 using a certain wireless communication method. The reception unit 16 receives transmission data including the unique information (second identification information) identifying the second cleaning robot 20 transmitted from the second cleaning robot 20. The reception unit 16 may receive transmission data using infrared light.

The signal analysis unit 17 determines whether transmission data received by the reception unit 16 includes the unique information regarding the first cleaning robot 10. If the received transmission data includes the unique information regarding the first cleaning robot 10, the signal analysis unit 17 transmits the result of the determination to the reception check unit 13. If the received transmission data does not include the unique information regarding the first cleaning robot 10, on the other hand, the signal analysis unit 17 discards the transmission data.

The reception check unit 13 determines whether to switch the control algorithm of the first cleaning robot 10 from the clockwise algorithm to the counterclockwise algorithm on the basis of transmission history information, which indicates that transmission data has been transmitted, and a result of a determination indicating that transmission data including the unique information regarding the first cleaning robot 10 has been received. More specifically, if there is no transmission history information but there is a result of a determination, that is, if the first cleaning robot 10 has not transmitted transmission data but has received transmission data from the second cleaning robot 20, the reception check unit 13 determines that the control algorithm of the first cleaning robot 10 is to be switched from the clockwise algorithm to the counterclockwise algorithm, and transmits the result of the determination to the algorithm switching unit 14. In other cases, the reception check unit 13 determines that the control algorithm of the first cleaning robot 10 is not to switch.

The algorithm switching unit 14 receives the result of the determination and switches the control algorithm of the first cleaning robot 10 from the clockwise algorithm to the counterclockwise algorithm.

When the second cleaning robot 20 autonomously moves using the first control algorithm, the algorithm switching unit 14 sets the second control algorithm to the first cleaning robot 10. When the second cleaning robot 20 autonomously moves using the second control algorithm, on the other hand, the algorithm switching unit 14 sets the first control algorithm to the first cleaning robot 10. If transmission data (second identification information) is received from the second cleaning robot 20 before transmission data (first identification information) is transmitted, the algorithm switching unit 14 switches the control algorithm of the first cleaning robot 10 from the first control algorithm to the second control algorithm.

The movement control unit 18 autonomously moves the first cleaning robot 10 using a control algorithm set by the algorithm switching unit 14. The movement control unit 18 outputs, to the movement unit 19, a control signal for autonomously moving the first cleaning robot 10 using the control algorithm.

The movement unit 19 is a motor, for example, and autonomously moves the first cleaning robot 10 on the basis of a control signal from the movement control unit 18.

Next, a method for autonomously moving a cleaning robot when a room is to be cleaned using two cleaning robots will be described.

Figure 2:
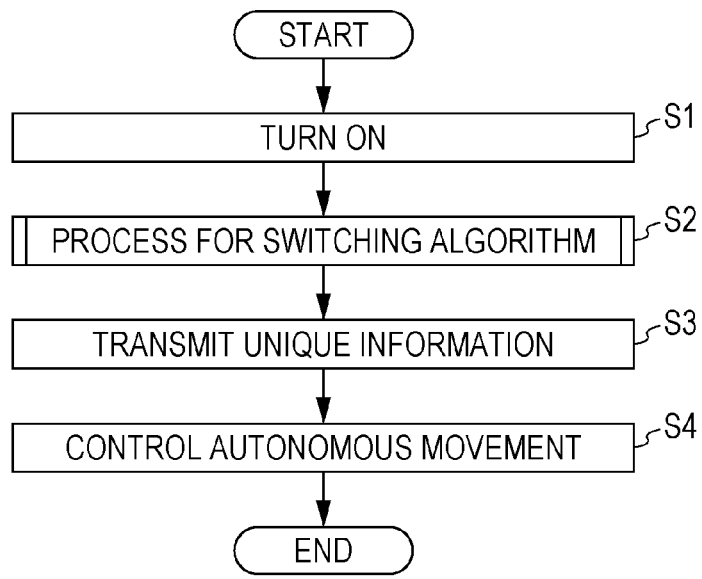
FIG. 2 is a flowchart illustrating a method for autonomously moving a first cleaning robot according to the first embodiment of the present disclosure.

FIG. 2 is a flowchart illustrating a method for autonomously moving the first cleaning robot 10 according to the first embodiment of the present disclosure. A method for autonomously moving the second cleaning robot 20 is the same as the method for autonomously moving the first cleaning robot 10, and description thereof is omitted.

The first cleaning robot 10 can use at least two control algorithms. The two control algorithms are, for example, the clockwise algorithm and the counterclockwise algorithm.

First, the first cleaning robot 10 turns on. The clockwise algorithm is initially set to the first cleaning robot 10 (step S1).

Next, the first cleaning robot 10 performs a process for switching an algorithm by which the control algorithm switches from the clockwise algorithm to the counterclockwise algorithm (step S2). The process for switching an algorithm will be described later with reference to FIG. 3. If transmission data including the unique information from the second cleaning robot 20, the first cleaning robot 10 switches the control algorithm from the clockwise algorithm to the counterclockwise algorithm.

Next, the first cleaning robot 10 broadcasts the transmission data including the unique information using a communication method employing infrared light, radio communication, or the like (step S3). As a result, the first cleaning robot 10 notifies the second cleaning robot 20 of the presence thereof.

Next, the first cleaning robot 10 controls the autonomous movement thereof on the basis of the control algorithm (step S4). The first cleaning robot 10 performs the processing in steps S2 to S4 while the first cleaning robot 10 is on, until a certain period of time elapses after the first cleaning robot 10 turns on, until remaining battery life becomes equal to or shorter than a certain value after the first cleaning robot 10 turns on, or until cleaning is completed after the first cleaning robot 10 turns on.

Next, the process for switching an algorithm in step S2 illustrated in FIG. 2 will be described.

Figure 3:
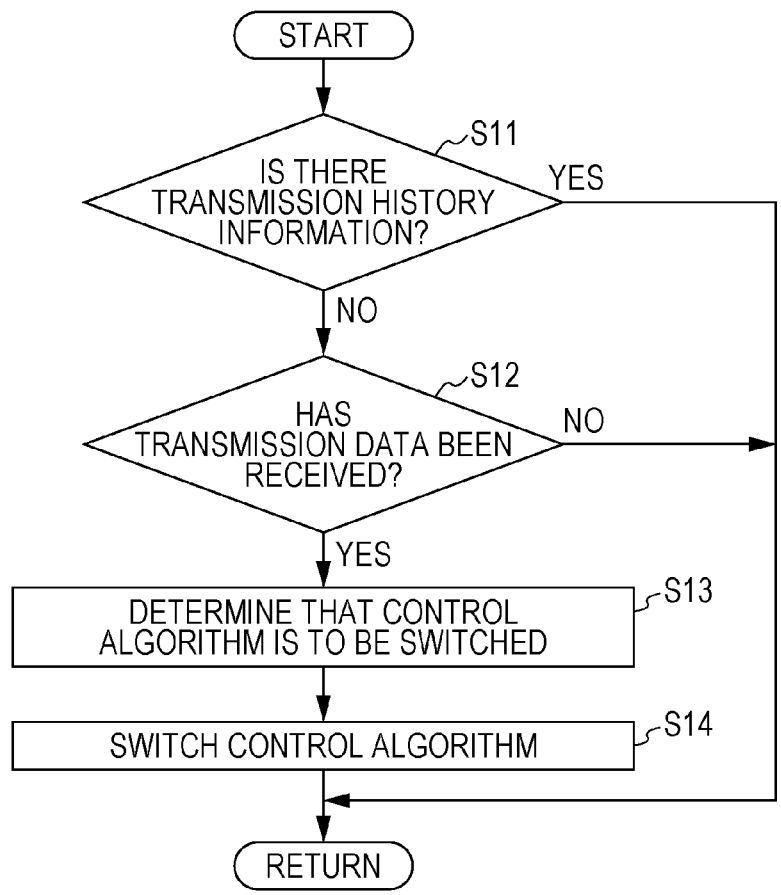
FIG. 3 is a flowchart illustrating a process for switching an algorithm in step S2 illustrated in FIG. 2.

FIG. 3 is a flowchart illustrating the process for switching an algorithm in step S2 illustrated in FIG. 2. The reception check unit 13 determines whether to switch the control algorithm of the first cleaning robot 10 from the clockwise algorithm to the counterclockwise algorithm on the basis of transmission history information and a result of a reception determination.

First, the reception check unit 13 determines whether there is transmission history information, which indicates that transmission data has been transmitted (step S11). If the reception check unit 13 determines that there is transmission history information (YES in step S11), the process for switching an algorithm ends without switching the control algorithm of the first cleaning robot 10. After the process for switching an algorithm ends without switching the control algorithm, the movement control unit 18 controls the autonomous movement on the basis of the clockwise algorithm, which is the initial setting.

If the reception check unit 13 determines that there is no transmission history information (NO in step S11), on the other hand, the reception check unit 13 determines whether transmission data transmitted from the second cleaning robot 20 has been received (step S12). If the reception check unit 13 determines that transmission data has not been received (NO in step S12), the process for switching an algorithm ends without switching the control algorithm of the first cleaning robot 10.

If the reception check unit 13 determines that transmission data has been received, that is, if the first cleaning robot 10 has not transmitted transmission data but has received transmission data from the second cleaning robot 20 (YES in step S12), the reception check unit 13 determines that the control algorithm of the first cleaning robot 10 is to be switched from the clockwise algorithm to the counterclockwise algorithm (step S13). The reception check unit 13 transmits the result of the determination to the algorithm switching unit 14.

Next, the algorithm switching unit 14 switches the control algorithm of the first cleaning robot 10 from the clockwise algorithm to the counterclockwise algorithm on the basis of the result of the determination transmitted from the reception check unit 13 (step S14).

Figure 4:
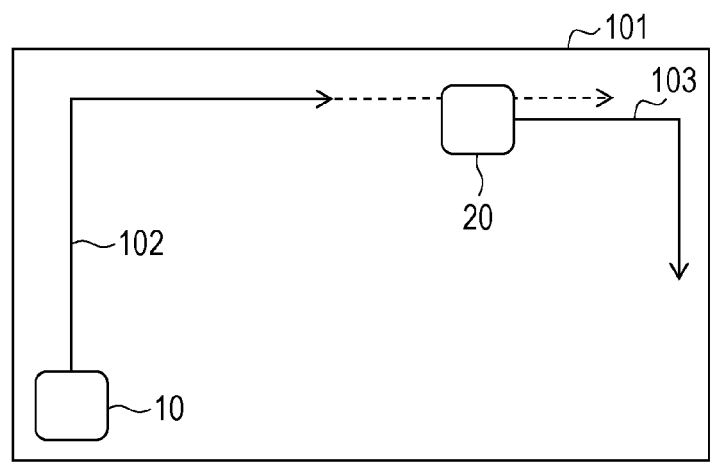
FIG. 4 is a diagram illustrating the movement of the first cleaning robot before a control algorithm switches.
Figure 5:
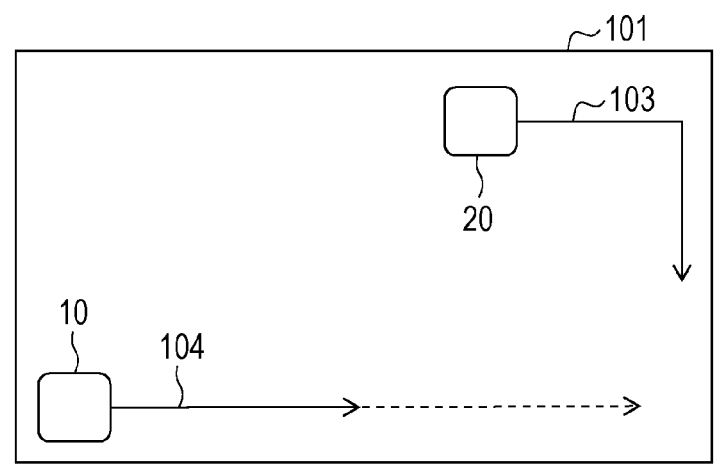
FIG. 5 is a diagram illustrating the movement of the first cleaning robot after the control algorithm switches.

FIG. 4 is a diagram illustrating the movement of the first cleaning robot 10 before the control algorithm switches. FIG. 5 is a diagram illustrating the movement of the first cleaning robot 10 after the control algorithm switches. In FIGS. 4 and 5, the first and second cleaning robots 10 and 20 clean a room 101 while autonomously moving in the room 101.

As illustrated in FIG. 4, if the control algorithm of the first cleaning robot 10 is not switched and both the first and second cleaning robots 10 and 20 operate using the clockwise algorithm, a movement direction 102 of the first cleaning robot 10 and a movement direction 103 of the second cleaning robot 20 are the same. As a result, the first cleaning robot 10 follows the second cleaning robot 20 and cleans an area that has already been cleaned by the second cleaning robot 20. The first and second cleaning robots 10 and 20 thus move along substantially the same route and do not efficiently clean the room 101.

On the other hand, as illustrated in FIG. 5, if the control algorithm of the first cleaning robot 10 switches and the first cleaning robot 10 operates using the counterclockwise algorithm and the second cleaning robot 20 operates using the clockwise algorithm, a movement direction 104 of the first cleaning robot 10 is different from the movement direction 103 of the second cleaning robot 20. As a result, the first and second cleaning robots 10 and 20 efficiently clean the room 101 while moving along different routes.

Since the first and second cleaning robots 10 and 20 autonomously move using different control algorithms, the first and second cleaning robots 10 and 20 move along different routes. As a result, operation efficiencies of the first and second cleaning robots 10 and 20 improve.

It is to be noted that, in the first embodiment, if the algorithm switching unit 14 switches the control algorithm of the first cleaning robot 10 from the first control algorithm to the second control algorithm after the first cleaning robot 10 turns on, the algorithm switching unit 14 may maintain the second control algorithm until the first cleaning robot 10 turns off.

Second Embodiment

An autonomous mobile system according to a second embodiment of the present disclosure will be described. In the first embodiment, whether or not to switch the control algorithm is determined by determining whether transmission data including unique information has been received first. In the second embodiment, on the other hand, whether to switch the control algorithm is determined by comparing an identification number unique to a cleaning robot.

Figure 6:
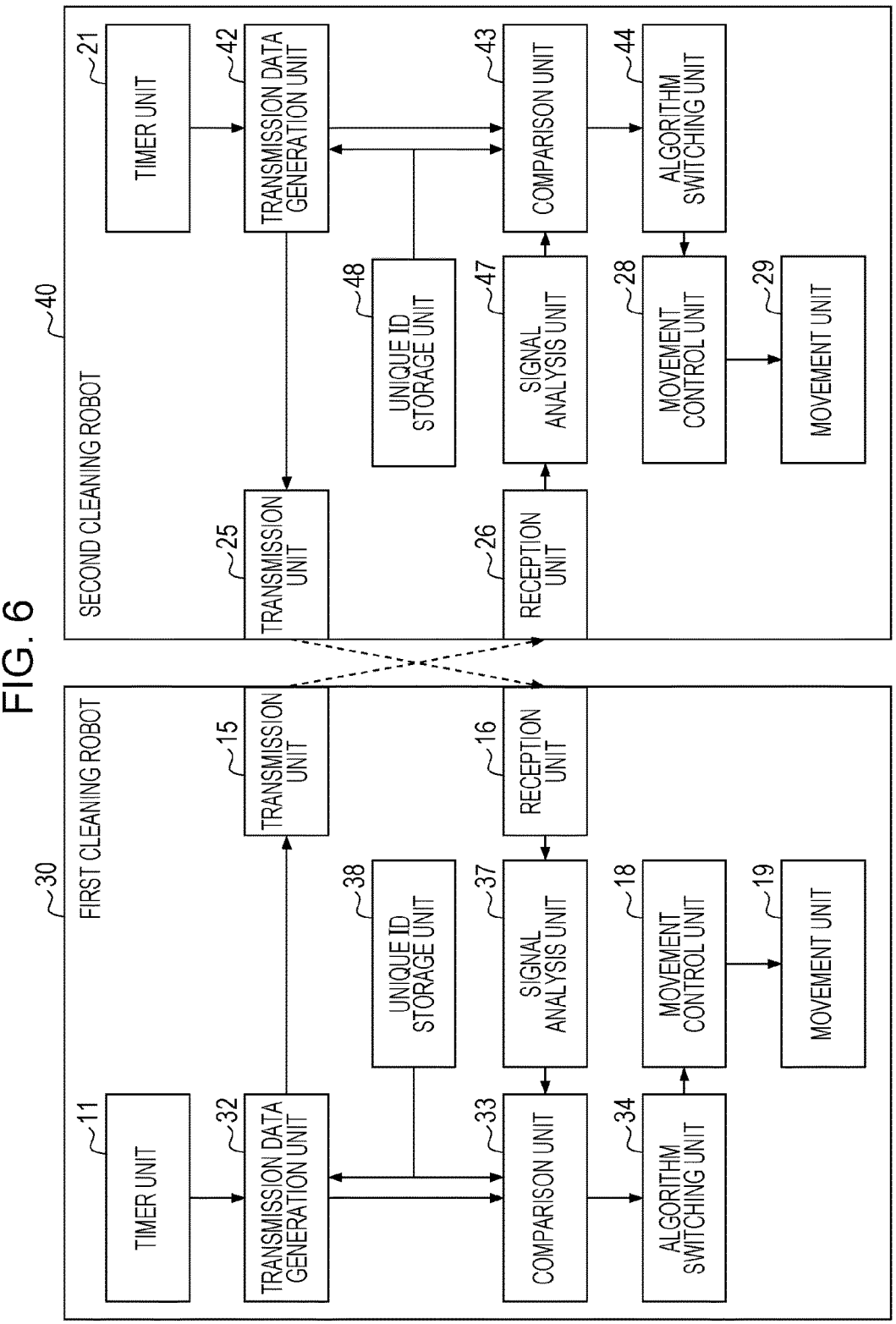
FIG. 6 is a block diagram illustrating the configuration of an autonomous mobile system according to a second embodiment of the present disclosure.

FIG. 6 is a block diagram illustrating the configuration of the autonomous mobile system according to the second embodiment of the present disclosure. The autonomous mobile system illustrated in FIG. 6 includes a first cleaning robot 30 and a second cleaning robot 40. In the autonomous mobile system illustrated in FIG. 6, the same components as those of the autonomous mobile system illustrated in FIG. 1 are given the same reference numerals, and description thereof is omitted.

In FIG. 6, the first cleaning robot 30 includes the timer unit 11, a transmission data generation unit 32, a comparison unit 33, an algorithm switching unit 34, the transmission unit 15, the reception unit 16, a signal analysis unit 37, the movement control unit 18, the movement unit 19, and a unique identifier (ID) storage unit 38.

In FIG. 6, the second cleaning robot 40 includes the timer unit 21, a transmission generation unit 42, a comparison unit 43, an algorithm switching unit 44, the transmission unit 25, the reception unit 26, a signal analysis unit 47, the movement control unit 28, the movement unit 29, and a unique ID storage unit 48.

The first cleaning robot 30 is an example of the autonomous mobile apparatus or the first autonomous mobile apparatus, and the second cleaning robot 40 is an example of the other autonomous mobile apparatus or the second autonomous mobile apparatus.

The configuration of second cleaning robot 40 is the same as that of the first cleaning robot 30, and only the configuration of the first cleaning robot 30 will be described.

The first and second cleaning robots 30 and 40 each hold a unique ID (identification number), which is a number. For example, the first cleaning robot 30 holds a unique ID "001", and the second cleaning robot 40 holds a unique ID "002". Each unique ID is held by the corresponding unique ID storage unit. That is, the unique ID storage unit 38 of the first cleaning robot 30 holds the unique ID "001", and the unique ID storage unit 48 of the second cleaning robot 40 holds the unique ID "002".

The unique ID storage unit 38 stores the ID (first identification number) unique to the first cleaning robot 30. The unique ID storage unit 48 stores the ID (second identification number) unique to the second cleaning robot 40. The unique IDs of the first and second cleaning robots 30 and 40 are different from each other.

The timer unit 11 regularly, namely every minute, for example, generates a timing at which transmission data including the unique ID identifying the first cleaning robot 30 is transmitted.

The transmission data generation unit 32 generates transmission data including the unique ID "001", which identifies the first cleaning robot 30, such that the transmission data does not collide with noise or transmission data from the other cleaning robot. The transmission data generation unit 32 transmits the generated transmission data to the transmission unit 15. The transmission data generation unit 32 also transmits transmission history information, which indicates that the transmission data has been transmitted, to the comparison unit 33. The transmission data generation unit 32 reads the unique ID from the unique ID storage unit 38 and generates the transmission data including the unique ID.

The transmission unit 15 transmits the transmission data generated by the transmission data generation unit 32 using a certain wireless communication method. The transmission unit 15 transmits the transmission data including the unique ID (first identification number) identifying the first cleaning robot 30. Alternatively, the transmission unit 15 may transmit the transmission data using infrared light.

The reception unit 16 receives transmission data transmitted from the second cleaning robot 40 using a certain wireless communication method. The reception unit 16 receives transmission data including the ID (second identification number) unique to the second cleaning robot 40 and different from the unique ID (first identification number) of the first cleaning robot 30. Alternatively, the reception unit 16 may receive the transmission data using infrared light.

The signal analysis unit 37 determines whether transmission data received by the reception unit 16 includes a unique ID identifying a cleaning robot. If the received transmission data includes a unique ID, the signal analysis unit 37 transmits the unique ID included in the received transmission data to the comparison unit 33. If the received transmission data includes the unique ID of the second cleaning robot 40, the signal analysis unit 37 transmits the unique ID "002" to the comparison unit 33.

The comparison unit 33 compares the unique ID "002" transmitted from the signal analysis unit 37 and the unique ID "001" held by the unique ID storage unit 38 through calculation. The comparison unit 33 then determines whether to switch the control algorithm of the first cleaning robot 30 from the clockwise algorithm to the counterclockwise algorithm. More specifically, if the unique ID transmitted from the signal analysis unit 37 is larger than the unique ID held by the unique ID storage unit 38, the comparison unit 33 determines that the control algorithm of the first cleaning robot 30 is to be switched from the clockwise algorithm to the counterclockwise algorithm, and transmits the result of the determination to the algorithm switching unit 34. If the unique ID transmitted from the signal analysis unit 37 is smaller than the unique ID held by the unique ID storage unit 38, on the other hand, the comparison unit 33 determines that the control algorithm of the first cleaning robot 30 is not to switch.

Since the unique ID "002" transmitted from the signal analysis unit 37 is larger than the unique ID "001" held by the unique ID storage unit 38 in the second embodiment, the comparison unit 33 determines that the control algorithm of the first cleaning robot 30 is to be switched from the clockwise algorithm to the counterclockwise algorithm, and transmits the result of the determination to the algorithm switching unit 34.

Upon receiving the result of the determination, the algorithm switching unit 34 switches the control algorithm of the first cleaning robot 30 from the clockwise algorithm to the counterclockwise algorithm.

If the unique ID (second identification number) of the second cleaning robot 40 is larger than the unique ID (first identification number) of the first cleaning robot 30, the algorithm switching unit 34 switches the control algorithm of the first cleaning robot 30 from the first control algorithm to the second control algorithm.

Next, a process for switching an algorithm according to the second embodiment will be described. A method for autonomously moving the first and second cleaning robots 30 and 40 according to the second embodiment of the present disclosure is the same as the method for autonomously moving the first cleaning robot 10 as illustrated in FIG. 2, and description thereof is omitted.

Figure 7:
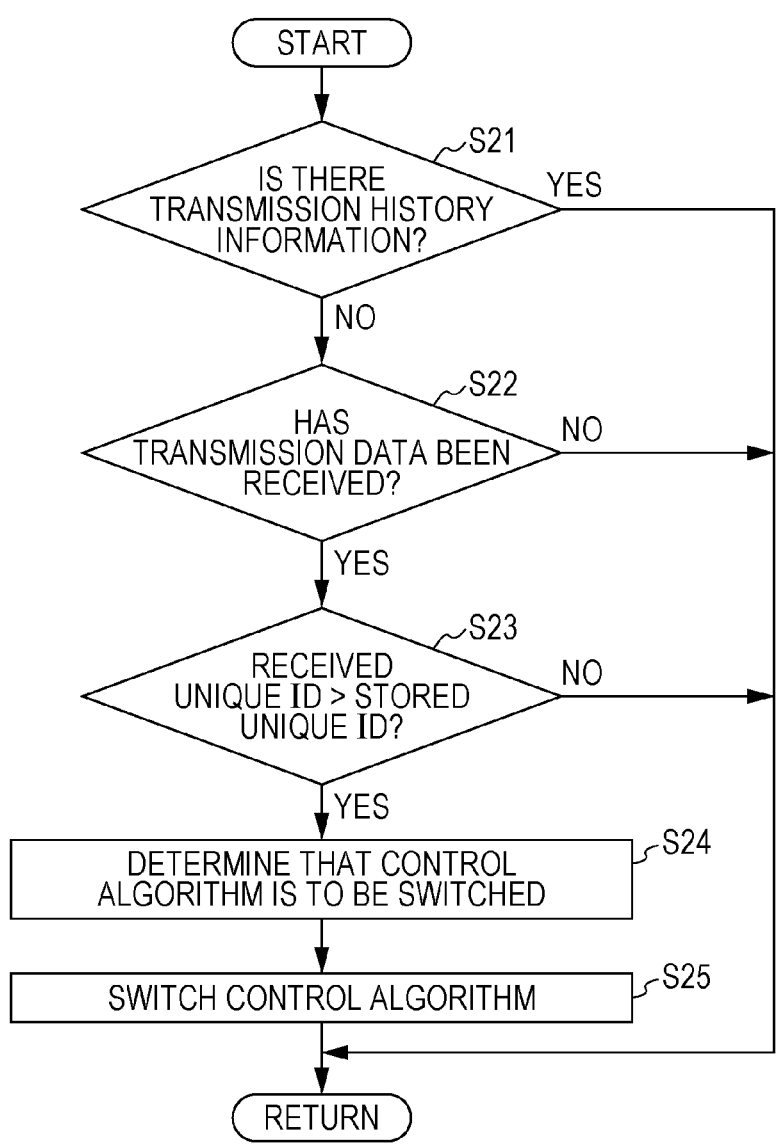
FIG. 7 is a flowchart illustrating a process for switching an algorithm according to the second embodiment.

FIG. 7 is a flowchart illustrating the process for switching an algorithm according to the second embodiment.

Processing in steps S21 and S22 is the same as that in steps S11 and S12 illustrated in FIG. 3, and description thereof is omitted.

Next, the comparison unit 33 determines whether a unique ID received by the reception unit 16 is larger than the unique ID stored in the unique ID storage unit 38 (step S23). Here, if the unique ID received by the reception unit 16 is smaller than the unique ID stored in the unique ID storage unit 38 (NO in step S23), the process for switching an algorithm ends without switching the control algorithm of the first cleaning robot 30. If the process for switching an algorithm ends without switching the control algorithm, the movement control unit 18 controls the autonomous movement on the basis of the clockwise algorithm, which is an initial setting.

On the other hand, if the comparison unit 33 determines that the unique ID received by the reception unit 16 is larger than the unique ID stored in the unique ID storage unit 38 (YES in step S23), the comparison unit 33 determines that the control algorithm of the first cleaning robot 30 is to be switched from the clockwise algorithm to the counterclockwise algorithm (step S24).

Next, the algorithm switching unit 34 receives the result of the determination from the comparison unit 33 and switches the control algorithm of the first cleaning robot 30 from the clockwise algorithm to the counterclockwise algorithm (step S25).

The autonomous movement of the first and second cleaning robots 30 and 40 is thus controlled using different control algorithms, and the first and second cleaning robots 30 and 40 move along different routes. As a result, operation efficiencies of the first and second cleaning robots 30 and 40 improve.

Third Embodiment

An autonomous mobile system according to a third embodiment of the present disclosure will be described. In the third embodiment, a cloud server provides different registration numbers for cleaning robots, and each cleaning robot determines whether to switch a control algorithm in accordance with the registration number provided by the cloud server.

How the movement of the cleaning robots is controlled when the cleaning robots are capable of communicating with the cloud server will be described.

Figure 8:
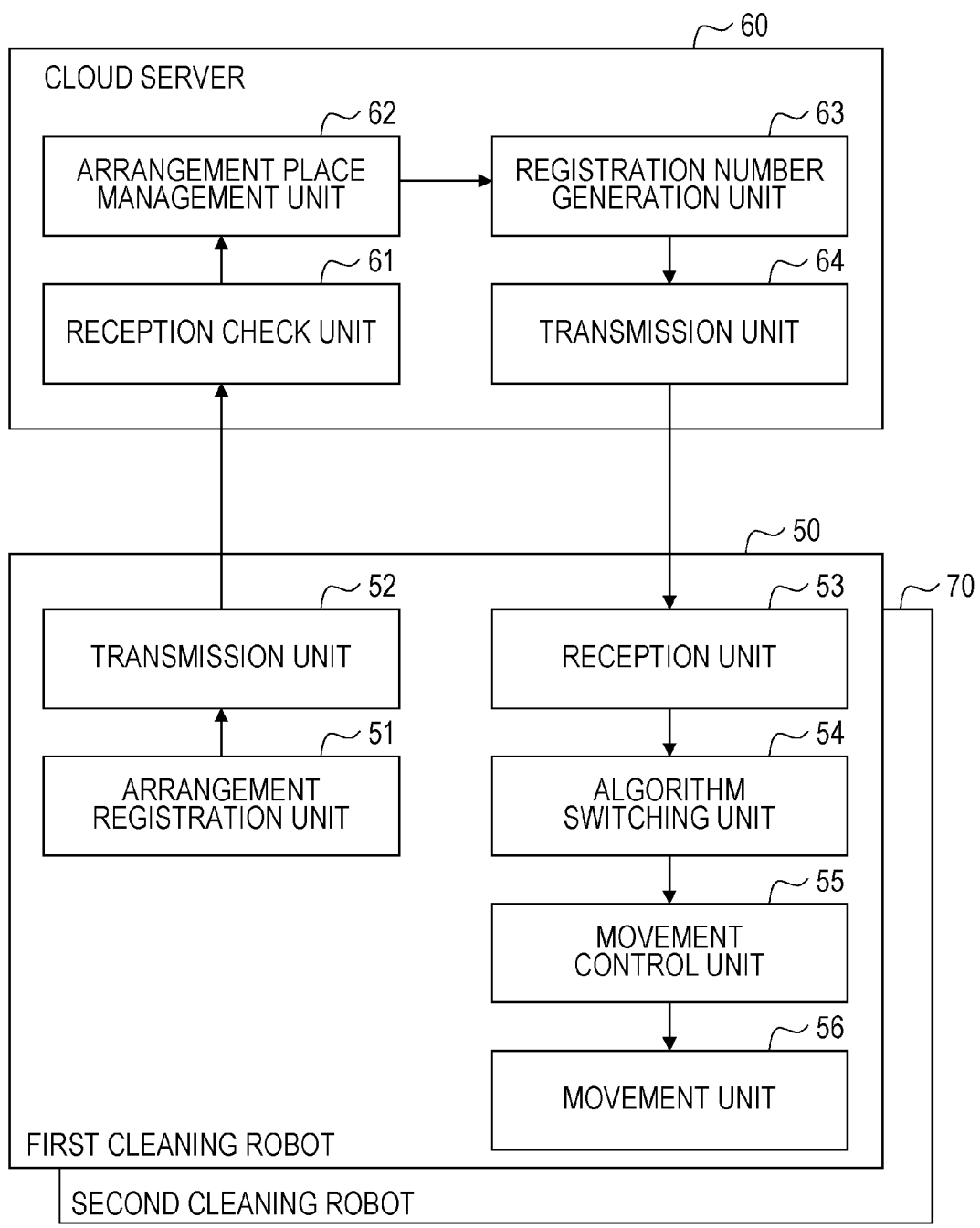
FIG. 8 is a block diagram illustrating the configuration of an autonomous mobile system according to a third embodiment of the present disclosure.

FIG. 8 is a block diagram illustrating the configuration of the autonomous mobile system according to the third embodiment of the present disclosure. The autonomous mobile system illustrated in FIG. 8 includes a first cleaning robot 50, a second cleaning robot 70, and a cloud server 60.

In FIG. 8, the first cleaning robot 50 at least includes an arrangement registration unit 51, a transmission unit 52, a reception unit 53, an algorithm switching unit 54, a movement control unit 55, and a movement unit 56. In FIG. 8, the cloud server 60 at least includes a reception unit 61, an arrangement place management unit 62, a registration number generation unit 63, and a transmission unit 64.

The first cleaning robot 50 and the cloud server 60 are communicably connected to each other through a network. The second cleaning robot 70 and the cloud server 60, too, are communicably connected to each other through the network. The network is, for example, the Internet.

The components of the cloud server 60 may be included in one of the cleaning robots that serves as a master robot.

The first cleaning robot 50 is an example of the autonomous mobile apparatus or the first autonomous mobile apparatus, and the second cleaning robot 70 is an example of the other autonomous mobile apparatus or the second autonomous mobile apparatus.

The configuration of the second cleaning robot 70 is the same as that of the first cleaning robot 50, and only the configuration of the first cleaning robot 50 will be described.

A user performs initial registration on the cloud server 60 before using the first cleaning robot 50 that he/she has purchased. The first cleaning robot 50 communicates with the cloud server 60 and registers an address of the user and the like. The cloud server 60 generates an identifiable registration number on the basis of the address of the user or the like, registers the registration number, and transmits the registration number to the first cleaning robot 50. When the cloud server 60 needs to generate a plurality of registration numbers for the same address, the cloud server 60 generates an even registration number if a previously generated number is an odd number and generates an odd registration number if a previously generated number is an even number. If a registration number transmitted from the cloud server 60 is an odd number, the first cleaning robot 50 employs the clockwise algorithm, and if a registration number transmitted from the cloud server 60 is an even number, the first cleaning robot 50 employs the counterclockwise algorithm.

The user registers a place where the first cleaning robot 50 is arranged, such as an address, using the arrangement registration unit 51. The arrangement registration unit 51 receives arrangement place information indicating the place where the first cleaning robot 50 is arranged from the user and outputs the received arrangement place information to the transmission unit 52. The arrangement registration unit 51 is, for example, an input device such as a touch panel. The arrangement place information may be information identifying a position of a room in a building, instead of an address.

The transmission unit 52 transmits, to the cloud server 60, unique information (identification information) identifying the first cleaning robot 50 and the arrangement place information indicating the place where the first cleaning robot 50 is arranged. The transmission unit 52 transmits, to the cloud server 60, transmission data including the arrangement place information received by the arrangement registration unit 51 and the unique information identifying the first cleaning robot 50. The unique information is, for example, information identifying a manufacturer of the first cleaning robot 50, information identifying a type of product of the first cleaning robot 50, or a serial number of the first cleaning robot 50. The unique information is stored in the first cleaning robot 50 in advance.

The reception unit 61 receives the transmission data transmitted from the first cleaning robot 50. The reception unit 61 outputs the unique information and the arrangement place information included in the received transmission data to the arrangement place management unit 62.

The arrangement place management unit 62 stores the unique information regarding the first cleaning robot 50 and the arrangement place information registered using the arrangement registration unit 51 while associating the unique information and the arrangement place information with each other.

The registration number generation unit 63 generates registration numbers on the basis of the number of cleaning robots arranged in the place registered to the arrangement place management unit 62. A first registration number generated by the registration number generation unit 63 is 1. The registration number generation unit 63 increases a registration number one by one for second and later cleaning robots.

The transmission unit 64 transmits the registration number generated by the registration number generation unit 63 to the first cleaning robot 50.

The reception unit 53 receives the registration number generated by the registration number generation unit 63 and transmitted from the transmission unit 64. The reception unit 53 receives, from the cloud server 60, the registration number generated on the basis of the number of cleaning robots arranged in the place.

If the registration number received by the reception unit 53 is an odd number, the algorithm switching unit 54 employs the clockwise algorithm, and if the registration number received by the reception unit 53 is an even number, the algorithm switching unit 54 employs the counterclockwise number.

If the registration number received by the reception unit 53 is an odd number, the algorithm switching unit 54 sets the first control algorithm to the first cleaning robot 50, and if the registration number received by the reception unit 53 is an even number, the algorithm switching unit 54 sets the second control algorithm to the first cleaning robot 50.

The movement control unit 55 autonomously moves the first cleaning robot 50 using the control algorithm set by the algorithm switching unit 54. The movement control unit 55 outputs, to the movement unit 56, a control signal for autonomously moving the first cleaning robot 50 using the control algorithm.

The movement unit 56 includes, for example, a motor, and autonomously moves the first cleaning robot 50 on the basis of the control signal from the movement control unit 55.

If the first cleaning robot 50 is registered to the cloud server 60 and then the second cleaning robot 70 is registered to the cloud server 60, for example, an odd registration number is provided for the first cleaning robot 50, and an even registration number is provided for the second cleaning robot 70. As a result, the first control algorithm (e.g., the clockwise algorithm) is set to the first cleaning robot 50, and the second control algorithm (e.g., the counterclockwise algorithm) is set to the second cleaning robot 70.

The autonomous movement of the first and second cleaning robots 50 and 70 is thus controlled using different control algorithms, and the first and second cleaning robots 50 and 70 move along different routes. As a result, operation efficiencies of the first and second cleaning robots 50 and 70 improve.

Fourth Embodiment

A cleaning robot according to a fourth embodiment of the present disclosure will be described. In the fourth embodiment, if there is another cleaning robot to the left of the cleaning robot, the clockwise algorithm, by which a cleaning robot moves mainly clockwise, is set to the cleaning robot, and if there is the other cleaning robot to the right of the cleaning robot, the counterclockwise algorithm, by which a cleaning robot moves mainly counterclockwise, is set to the cleaning robot.

Figure 9:
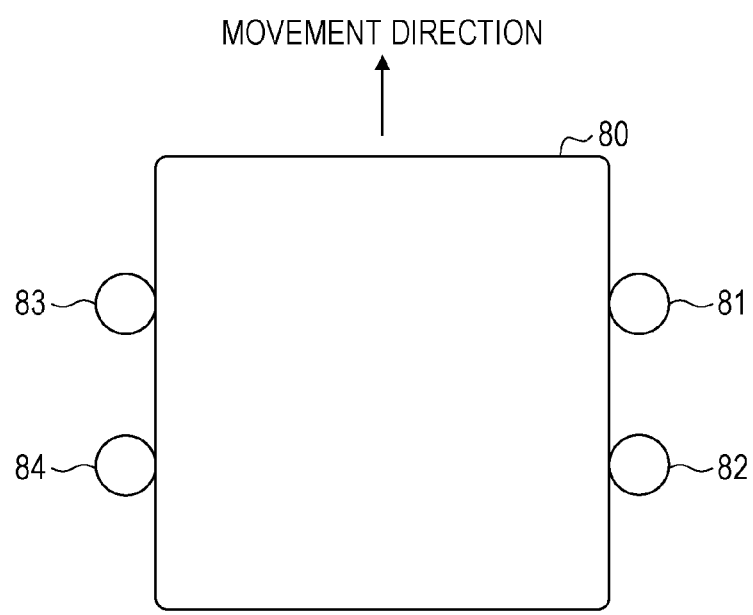
FIG. 9 is a diagram illustrating the appearance of a cleaning robot according to a fourth embodiment of the present disclosure viewed from above.
Figure 10:
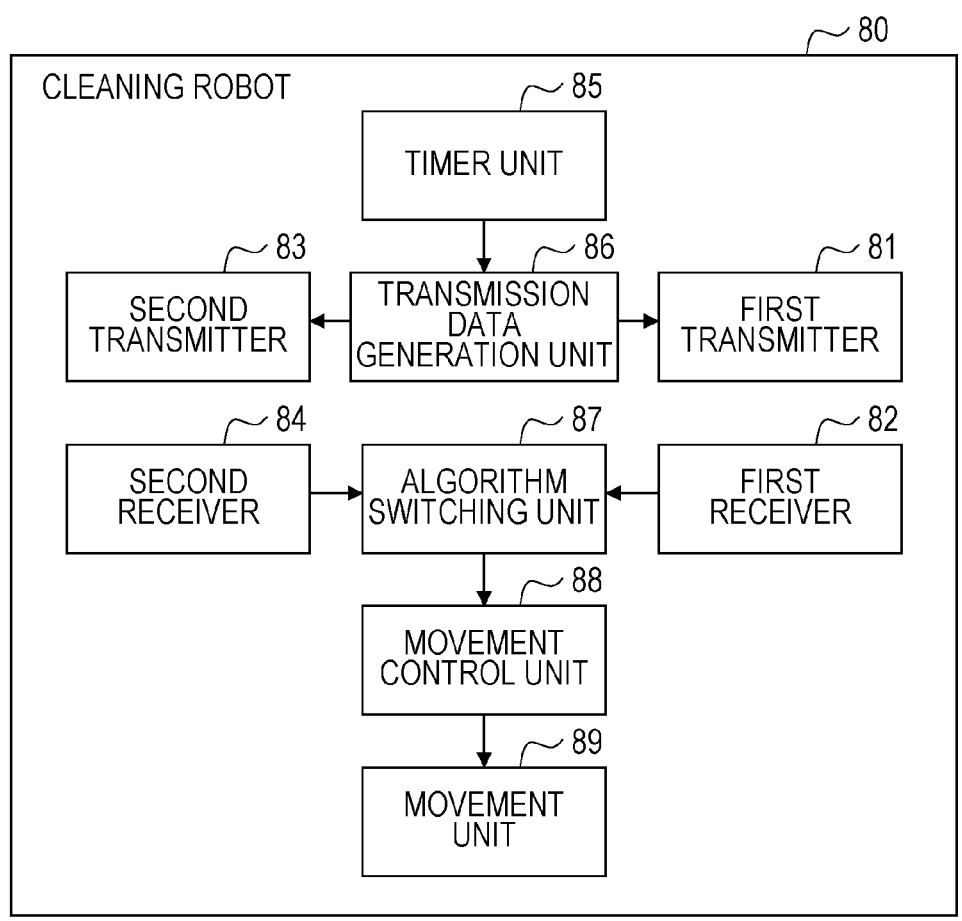
FIG. 10 is a block diagram illustrating the configuration of the cleaning robot according to the fourth embodiment of the present disclosure.

FIG. 9 is a diagram illustrating the appearance of the cleaning robot according to the fourth embodiment of the present disclosure viewed from above. FIG. 10 is a block diagram illustrating the configuration of the cleaning robot according to the fourth embodiment of the present disclosure.

In FIGS. 9 and 10, a cleaning robot 80 includes a first transmitter 81, a first receiver 82, a second transmitter 83, a second receiver 84, a timer unit 85, a transmission data generation unit 86, an algorithm switching unit 87, a movement control unit 88, and a movement unit 89. The cleaning robot 80 is an example of the autonomous mobile apparatus.

The timer unit 85 regularly, namely every minute, for example, generates a timing at which transmission data including unique information identifying the cleaning robot 80 is transmitted. The unique information is, for example, information identifying a manufacturer of the cleaning robot 80. The unique information regarding the cleaning robot 80 is the same as unique information regarding the other cleaning robot.

The transmission data generation unit 86 generates transmission data including the unique information identifying the cleaning robot 80.

The first transmitter 81 is arranged on a right surface of the cleaning robot 80 and includes, for example, a light-emitting device that emits infrared light. The first transmitter 81 transmits transmission data generated by the transmission data generation unit 86 rightward relative to a movement direction of the cleaning robot 80.

The first receiver 82 is arranged on the right surface of the cleaning robot 80 and includes, for example, a light-receiving device that receives infrared light. The first receiver 82 receives transmission information including the unique information (identification information) identifying the other cleaning robot from the other cleaning robot located rightward relative to the movement direction of the cleaning robot 80.

The second transmitter 83 is arranged on a left surface of the cleaning robot 80 and includes, for example, a light-emitting device that emits infrared light. The second transmitter 83 transmits transmission data generated by the transmission data generation unit 86 leftward relative to the movement direction of the cleaning robot 80. The first and second transmitter 81 and 83 simultaneously broadcast the transmission data.

The second receiver 84 is arranged on the left surface of the cleaning robot 80 and includes, for example, a light-receiving device that receives infrared light. The second receiver 84 receives transmission data including the unique information (identification information) identifying the other cleaning robot from the other cleaning robot located leftward relative to the movement direction of the cleaning robot 80.

If the first receiver 82 receives the unique information (identification information), the algorithm switching unit 87 sets the counterclockwise algorithm to the cleaning robot 80. If the second receiver 84 receives the unique information (identification information), the algorithm switching unit 87 sets the clockwise algorithm to the cleaning robot 80.

The movement control unit 88 autonomously moves the cleaning robot 80 using the control algorithm set by the algorithm switching unit 87. The movement control unit 88 outputs, to the movement unit 89, a control signal for autonomously moving the cleaning robot 80 using the control algorithm.

The movement unit 89 includes, for example, a motor and autonomously moves the cleaning robot 80 in accordance with the control signal from the movement control unit 88.

The control algorithm of the cleaning robot 80 is thus determined in accordance with a position of the other cleaning robot. The cleaning robot 80 autonomously moves in a direction in which the other cleaning robot does not exist, and the cleaning robot 80 and the other cleaning robot follow different routes. As a result, operation efficiencies of the cleaning robot 80 and the other cleaning robot improve.

Fifth Embodiment

A cleaning robot according to a fifth embodiment of the present disclosure will be described. In the fifth embodiment, if there is another cleaning robot behind of the cleaning robot, a current control algorithm of the cleaning robot is maintained, and if there is the other cleaning robot ahead of the cleaning robot, the control algorithm of the cleaning robot switches from the current control algorithm to another control algorithm.

Figure 11:
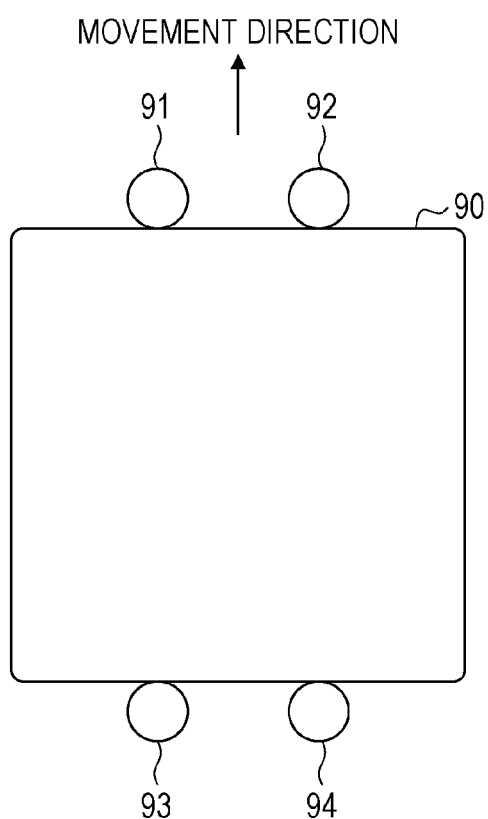
FIG. 11 is a diagram illustrating the appearance of a cleaning robot according to a fifth embodiment of the present disclosure viewed from above.
Figure 12:
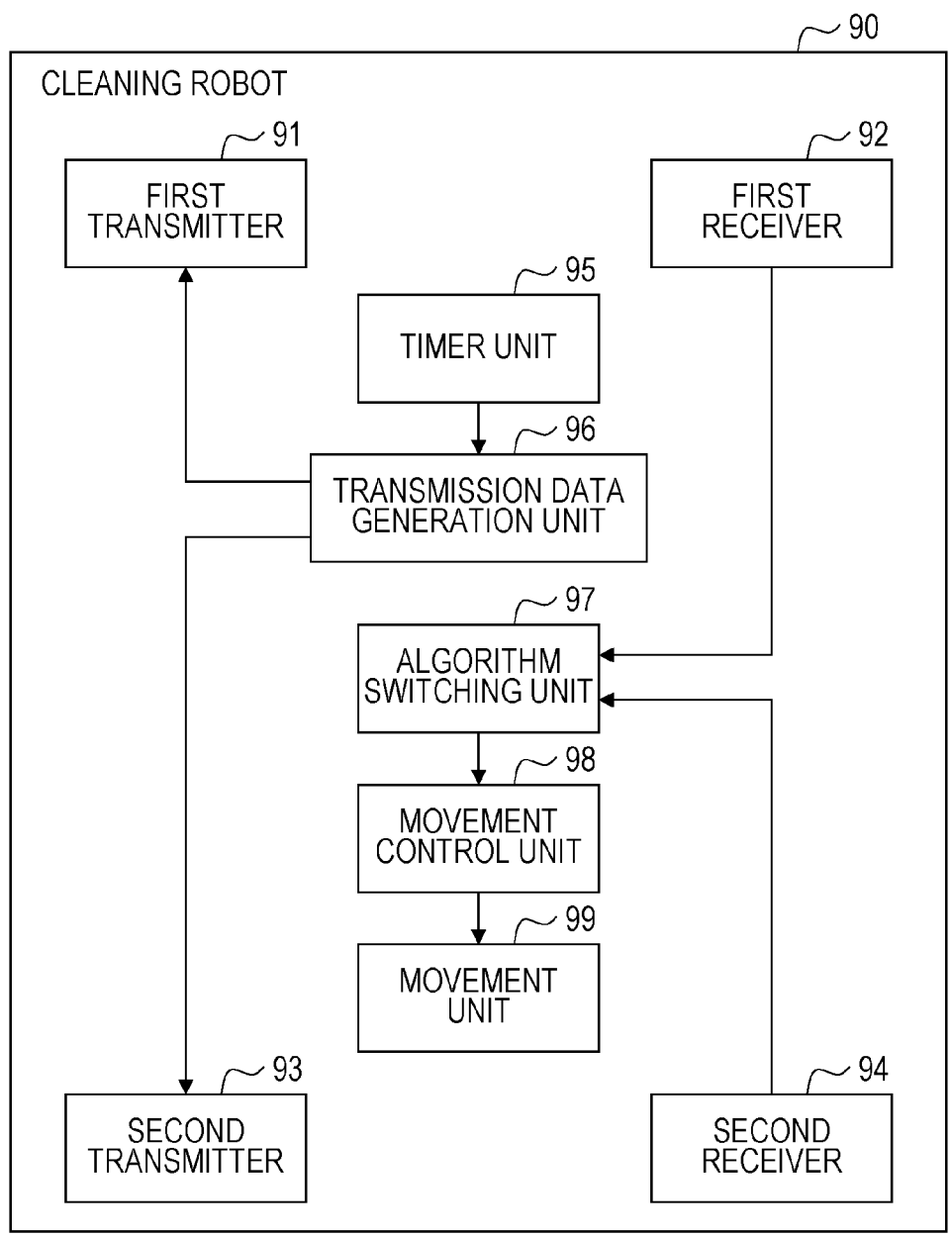
FIG. 12 is a block diagram illustrating the configuration of the cleaning robot according to the fifth embodiment of the present disclosure.

FIG. 11 is a diagram illustrating the appearance of the cleaning robot according to the fifth embodiment of the present disclosure viewed from above. FIG. 12 is a block diagram illustrating the configuration of the cleaning robot according to the fifth embodiment of the present disclosure.

In FIGS. 11 and 12, a cleaning robot 90 includes a first transmitter 91, a first receiver 92, a second transmitter 93, a second receiver 94, a timer unit 95, a transmission data generation unit 96, an algorithm switching unit 97, a movement control unit 98, and a movement unit 99. The cleaning robot 90 is an example of the autonomous mobile apparatus.

The timer unit 95 regularly, namely every minute, for example, generates a timing at which transmission data including unique information identifying the cleaning robot 90 is transmitted. The unique information is, for example, information identifying a manufacturer of the cleaning robot 90. The unique information regarding the cleaning robot 90 and unique information regarding the other cleaning robot are the same.

The transmission data generation unit 96 generates transmission data including the unique information identifying the cleaning robot 90.

The first transmitter 91 is arranged on a front surface of the cleaning robot 90 and includes, for example, a light-emitting device that emits infrared light. The first transmitter 91 transmits transmission data generated by the transmission data generation unit 96 forward, which is a movement direction of the cleaning robot 90.

The first receiver 92 is arranged on the front surface of the cleaning robot 90 and includes, for example, a light-receiving device that receives infrared light. The first receiver 92 receives transmission data including the unique information (identification information) identifying the other cleaning robot from the other cleaning robot located ahead of the cleaning robot 90.

The second transmitter 93 is arranged on a rear surface of the cleaning robot 90 and includes, for example, a light-emitting device that emits infrared light. The second transmitter 93 transmits transmission data generated by the transmission data generation unit 96 rearward, which is opposite the movement direction of the cleaning robot 90. The first transmitter 91 and the second transmitter 93 simultaneously broadcast the transmission data.

The second receiver 94 is arranged on the rear surface of the cleaning robot 90 and includes a light-receiving device that receives infrared light. The second receiver 94 receives the unique information (identification information) identifying the other cleaning robot from the other cleaning robot located behind the cleaning robot 90.

If the second receiver 94 receives the unique information (identification information), the algorithm switching unit 97 maintains the current control algorithm. If the first receiver 92 receives the unique information (identification information), the algorithm switching unit 97 switches the control algorithm of the cleaning robot 90 from the current control algorithm to another control algorithm. If the current control algorithm of the cleaning robot 90 is the clockwise algorithm and the first receiver 92 receives the unique information, for example, the algorithm switching unit 97 switches the control algorithm from the clockwise algorithm to the counterclockwise algorithm. If the current control algorithm of the cleaning robot 90 is the clockwise algorithm and the second receiver 94 receives the unique information, the algorithm switching unit 97 maintains the current control algorithm, which is the clockwise algorithm.

The movement control unit 98 autonomously moves the cleaning robot 90 using the control algorithm set by the algorithm switching unit 97. The movement control unit 98 outputs, to the movement unit 99, a control signal for autonomously moving the cleaning robot 90 using the control algorithm.

The movement unit 99 includes, for example, a motor and autonomously moves the cleaning robot 90 in accordance with the control signal from the movement control unit 98.

The current control algorithm is thus maintained if the other cleaning robot is located behind the cleaning robot 90, and the control algorithm of the cleaning robot 90 switches from the current control algorithm to another control algorithm if the other cleaning robot is located ahead of the cleaning robot 90. The cleaning robot 90 and the other cleaning robot, therefore, move along different routes. As a result, operation efficiencies of the cleaning robot 90 and the other cleaning robot improve.

Although two cleaning robots autonomously move using different control algorithms in the first to fifth embodiments, the present disclosure is not particularly limited to this. Three or more cleaning robots may autonomously move using different control algorithms, instead.

If an autonomous mobile system includes first to fourth cleaning robots, for example, an area (room) in which the first to fourth cleaning robots operate may be divided into a first part and a second part, and the first cleaning robot may autonomously move in the first part using a first control algorithm, the second cleaning robot may autonomously move in the first part using a second control algorithm, the third cleaning robot may autonomously move in the second part using the first control algorithm, and the fourth cleaning robot may autonomously move in the second part using the second control algorithm.

By dividing an area in which a plurality of cleaning robots operate into a plurality of parts and autonomously moving the plurality of cleaning robots in the plurality of parts, the plurality of cleaning robots can autonomously move in the plurality of parts using different control algorithms, even if the number of control algorithms is small.

Although a cleaning robot that cleans a certain area while autonomously moving in the certain area has been described in the first to fifth embodiments as an example of the autonomous mobile apparatus, the present disclosure is not particularly limited to this. The autonomous mobile apparatus may be a mowing robot that mows grass while autonomously moving in a certain area or a painting robot that paints a certain area while autonomously moving in the certain area, instead.

Although the control algorithm is the clockwise algorithm or the counterclockwise algorithm in the first to fifth embodiments, the present disclosure is not particularly limited to this. The control algorithm may be an algorithm by which a cleaning robot moves spirally outward from the center of a certain area or an algorithm by which a cleaning robot moves spirally inward from the periphery of a certain area, instead. The control algorithm is not limited to any of the above.

In the present disclosure, some or all of the units, the apparatuses, the members, and the sections or some or all of the function blocks illustrated in the block diagrams may be achieved by one or a plurality of electronic circuits including a semiconductor device, a semiconductor integrated circuit (IC), or a large-scale integration (LSI) circuit. The LSI circuit or the IC may be achieved on a single chip, or may be achieved by combining a plurality of chips. The function blocks other than the storage device may be integrated on a single chip. Although the terms "LSI" and "IC" are used here, a term "system LSI", "very-large-scale integration (VLSI)", or "ultra-large-scale integration (ULSI)" may be used, instead, depending on a degree of integration. A field-programmable gate array (FPGA), which is programmed after an LSI circuit is fabricated, or a reconfigurable logic device, which is capable of reconfiguring connections inside an LSI circuit or setting up circuit sections inside the LSI circuit, can be used for the same purposes.

Furthermore, some or all of the functions or the operations of the units, the apparatuses, the members, and the sections may be achieved through a software process. In this case, software is stored in one or a plurality of non-transitory recording media such as read-only memories (ROMs), optical discs, or hard disk drives, and when the software is executed by a processor, the functions specified by the software are achieved by the processor and peripheral devices. A system or an apparatus may include one or a plurality of non-transitory recording media storing the software, the processor, and a necessary hardware device such as an interface.

The autonomous mobile apparatus, the autonomous mobile method, and the autonomous mobile system in the present disclosure are capable of moving a plurality of autonomous mobile apparatuses along different routes and effective as an autonomous mobile apparatus, an autonomous mobile method, and an autonomous mobile system in which autonomous movement is performed in a certain area using a method for controlling autonomous movement.

What is claimed is:

1. An autonomous mobile apparatus comprising:
   a processor; and
   one or more memories which store an executable set of instructions which, when executed by the processor, cause the processor to perform operations including
   determining a first control method or a second control method as a control method for controlling the autonomous mobile apparatus on the basis of information regarding another autonomous mobile apparatus, the first control method being a method for controlling the autonomous mobile apparatus or the other autonomous mobile apparatus such that the autonomous mobile apparatus or the other autonomous mobile apparatus autonomously moves in a certain area using a first control algorithm and the second control method being a method for controlling the autonomous mobile apparatus or the other autonomous mobile apparatus such that the autonomous mobile apparatus or the other autonomous mobile apparatus autonomously moves in the certain area using a second control algorithm, and
   autonomously moving the autonomous mobile apparatus using the determined control method.

2. The autonomous mobile apparatus according to claim 1,
   wherein, in the determining, the second control method is determined as the method for controlling the autonomous mobile apparatus if the other autonomous mobile apparatus autonomously moves using the first control method, and the first control method is determined as the method for controlling the autonomous mobile apparatus if the other autonomous mobile apparatus autonomously moves using the second control method.

3. The autonomous mobile apparatus according to claim 1,
   wherein the first control method is a method by which the autonomous mobile apparatus or the other autonomous mobile apparatus moves mainly clockwise, and
   wherein the second control method is a method by which the autonomous mobile apparatus or the other autonomous mobile apparatus moves mainly counterclockwise.

4. The autonomous mobile apparatus according to claim 3, further comprising:
   a first receiver that, if the other autonomous mobile apparatus is located rightward relative to a movement direction of the autonomous mobile apparatus, receives identification information identifying the other autonomous mobile apparatus; and
   a second receiver that, if the other autonomous mobile apparatus is located leftward relative to the movement direction of the autonomous mobile apparatus, receives the identification information identifying the other autonomous mobile apparatus,
   wherein, in the determining, the second control method is determined as the method for controlling the autonomous mobile apparatus if the first receiver receives the identification information, and the first control method is determined as the method for controlling the autonomous mobile apparatus if the second receiver receives the identification information.

5. The autonomous mobile apparatus according to claim 1, further comprising:
   a transmitter that transmits first identification information identifying the autonomous mobile apparatus; and
   a receiver that receives second identification information identifying the other autonomous mobile apparatus transmitted from the other autonomous mobile apparatus,
   wherein the first control method is initially set as the method for controlling the autonomous mobile apparatus, and
   wherein, in the determining, the method for controlling the autonomous mobile apparatus switches from the first control method to the second control method if the second identification information is received before the first identification information is transmitted.

6. The autonomous mobile apparatus according to claim 5,
   wherein, in the determining, if the method for controlling the autonomous mobile apparatus switches from the first control method to the second control method after the autonomous mobile apparatus turns on, the second control method is maintained until the autonomous mobile apparatus turns off.

7. The autonomous mobile apparatus according to claim 1, further comprising:
   a storage that stores a first identification number unique to the autonomous mobile apparatus; and
   a receiver that receives a second identification number, which is different from the first identification number, unique to the other autonomous mobile apparatus,
   wherein the first control method is initially set as the method for controlling the autonomous mobile apparatus, and
   wherein, in the determining, the method for controlling the autonomous mobile apparatus switches from the first control method to the second control method if the second identification number is larger than the first identification number.

8. The autonomous mobile apparatus according to claim 1, further comprising:
   a transmitter that transmits, to a server, identification information identifying the autonomous mobile apparatus and arrangement place information indicating a place where the autonomous mobile apparatus is arranged; and a receiver that receives, from the server, a registration number provided for the autonomous mobile apparatus on the basis of a number of autonomous mobile apparatuses arranged in the place, each of the autonomous mobile apparatuses being the autonomous mobile apparatus, wherein, in the determining, the first control method is determined as the method for controlling the autonomous mobile apparatus if the received registration number is an odd number, and the second control method is determined as the method for controlling the autonomous mobile apparatus if the received registration number is an even number.

9. The autonomous mobile apparatus according to claim 1, further comprising:

a front receiver that receives identification information identifying the other autonomous mobile apparatus if the other autonomous mobile apparatus is located ahead of the autonomous mobile apparatus in a movement direction of the autonomous mobile apparatus; and a rear receiver that receives the identification information identifying the other autonomous mobile apparatus if the other autonomous mobile apparatus is located behind the autonomous mobile apparatus in the movement direction of the autonomous mobile apparatus, wherein, in the determining, a current control method is maintained as the method for controlling the autonomous mobile apparatus if the rear receiver receives the identification information, and the method for controlling the autonomous mobile apparatus switches from the current control method to another control method if the front receiver receives the identification information.

10. A method for autonomously moving an autonomous mobile apparatus, the method comprising:

determining a second control method as a control method for controlling the autonomous mobile apparatus if another autonomous mobile apparatus autonomously moves using a first control method or the first control method as the control method for controlling the autonomous mobile apparatus if the other autonomous mobile apparatus autonomously moves using the second control method, the first control method being a method for controlling the autonomous mobile apparatus or the other autonomous mobile apparatus such that the autonomous mobile apparatus or the other autonomous mobile apparatus autonomously moves in a certain area using a first control algorithm and the second control method being a method for controlling the autonomous mobile apparatus or the other autonomous mobile apparatus such that the autonomous mobile apparatus or the other autonomous mobile apparatus autonomously moves in the certain area using a second control algorithm; and autonomously moving the autonomous mobile apparatus using the determined control method.

11. An autonomous mobile system comprising:

a first autonomous mobile apparatus; and a second autonomous mobile apparatus, wherein the first autonomous mobile apparatus includes:
a processor; and
one or more memories which store an executable set of instructions, which when executed by the processor, cause the processor to perform operations including determining a second control method as a control method for controlling the first autonomous mobile apparatus if the second autonomous mobile apparatus autonomously moves using a first control method or the first control method as the control method for controlling the first autonomous mobile apparatus if the second autonomous mobile apparatus autonomously moves using the second control method, the first control method being a method for controlling the first autonomous mobile apparatus or the second autonomous mobile apparatus such that the first autonomous mobile apparatus or the second autonomous mobile apparatus autonomously moves in a certain area using a first control algorithm and the second control method being a method for controlling the first autonomous mobile apparatus or the second autonomous mobile apparatus such that the first autonomous mobile apparatus or the second autonomous mobile apparatus autonomously moves in the certain area using a second control algorithm, and autonomously moving the first autonomous mobile apparatus using the determined control method for controlling the first autonomous mobile apparatus, wherein the second autonomous mobile apparatus includes circuitry which, in operation, performs operations including determining the first control method or the second control method as a control method for controlling the second autonomous mobile apparatus, and autonomously moving the second autonomous mobile apparatus using the determined control method for controlling the second autonomous mobile apparatus.

* * * * *